United States Patent [19]

Detroit et al.

[11] E Patent Number: Re. 32,895

[45] Reissued Date of Patent: Mar. 28, 1989

[54] SOLUBILIZED LIGNOSULFONATE DERIVATIVES

[75] Inventors: William J. Detroit, Schofield; Michael E. Sanford, Wausau, both of Wis.

[73] Assignee: Reed Lignin, Inc., Greenwich, Conn.

[21] Appl. No.: 303,036

[22] Filed: Sep. 17, 1981

Related U.S. Patent Documents

Reissue of:

[64] Patent No.: 4,069,217
Issued: Jan. 17, 1978
Appl. No.: 671,397
Filed: Mar. 29, 1976

U.S. Applications:

[63] Continuation of Ser. No. 135,455, Mar. 31, 1980, abandoned.

[51] Int. Cl.[4] ..... C07G 1/00
[52] U.S. Cl. ..... 530/500; 530/301
[58] Field of Search ..... 260/124; 530/500, 501

[56] References Cited

U.S. PATENT DOCUMENTS

| | | | |
|---|---|---|---|
| 2,680,113 | 6/1954 | Adler et al. | 530/500 |
| 2,789,974 | 4/1975 | Hagglund | 530/500 |
| 3,232,925 | 2/1966 | King et al. | 530/500 |
| 3,634,387 | 1/1972 | Dougherty | 530/500 |
| 3,681,318 | 8/1972 | Nahum | 530/500 |
| 3,784,493 | 1/1974 | Giguere et al. | 530/500 |

OTHER PUBLICATIONS

Acta Chemica Scandinavica 4 (1950) 228–238.

*Primary Examiner*—Delbert R. Phillips

[57] ABSTRACT

Valuable new and widely used compositions of matter are comprised of products having enhanced solubility and increased dispersant and the like surfactant activity which products are resulfonated units of alkaline oxidized, hydrolyzed, partially desulfonated lignosulfonates.

21 Claims, 1 Drawing Sheet

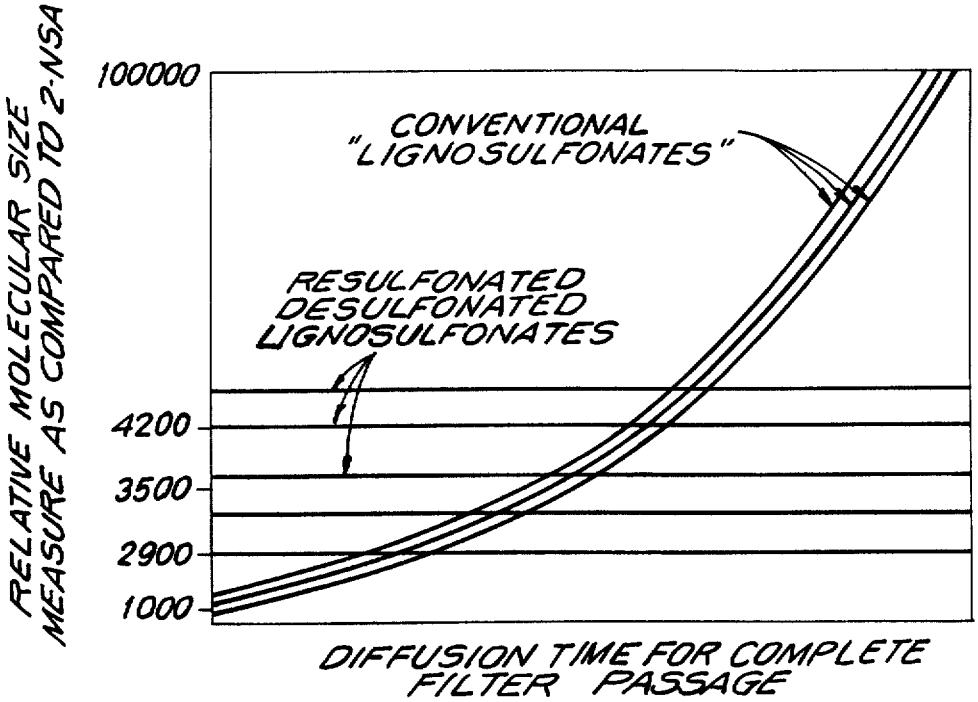
RELATIVE MOLECULAR SIZE MEASURE AS COMPARED TO 2-NSA
100000
4200
3500
2900
1000
CONVENTIONAL "LIGNOSULFONATES"
RESULFONATED DESULFONATED LIGNOSULFONATES
DIFFUSION TIME FOR COMPLETE FILTER PASSAGE

SOLUBILIZED LIGNOSULFONATE DERIVATIVES

Matter enclosed in heavy brackets [ ] appears in the original patent but forms no part of this reissue specification; matter printed in italics indicates the additions made by reissue.

*RELATED APPLICATIONS*

*This is a continuation of application Ser. No. 135,455 filed Mar. 31, 1980, now abandoned, which is, in turn, an application for reissue of U.S. Pat. No. 4,069,217 issued in Jan. 17, 1978.*

BACKGROUND OF THE INVENTION

Various and numerous sulfonated and otherwise derived lignin materials have already been found, known and developed and advantageously applied for many useful and beneficial purposes. This includes, the alkaline oxidized, partially desulfonated lignosulfonates of the type prepared according to the teachings and disclosures of U.S. Pat. No. 2,491,832 which are prepared from treatments of alkaline sulfite waste pulping liquir from wood conversion.

While numerous references are available dealing in one capacity or discipline or another with the identity and nature of lignin, per se, and many of the derivatives of lignin including lignosulfonates (all of which, by the way, are generally relatively imprecise and not positively definite), preparation and multitudinous uses of the contempated materials, substantial elucidation thereupon and thereof may also be found, by way of illustration, in U.S. Pat. Nos. 1,848,292; 2,371,136; 2,371,137; 2,505,304; 2,576,418; 2,598,311, 2,800,449; 3,156,520; and 3,726,850. Still additional are of interest is uncovered in U.S. Pat. Nos. Re. 18,268; 2,057,117; 2,104,701; 2,399,607; and 2,434,626.

Another excellent informational source in this area is the Bulletin (No. 131) published by AMERICA CAN COMPANY of Greenwich, Conn., 06830 (U.S.A.) entitled "Chemicals From Wood".

The alkaline oxidized, hydrolyzed, partially desulfonated lignosulfonates which are utilized as the starting materials in practice of and to obtain the novel resulfonated compositions of the present invention are, as indicated, usually most readily and conveniently obtained pursuant to the teachings of U.S. Pat. No. 2,491,832. In this process, especially if and when enhanced by product yields of vanillin are wanted, it is frequently more desirable to employ a waste pulping liquor for the process which is derived from a totally, or at least substantially, softwood source—although this is not an entirely restrictive limitation since hardwood starting materials can, of necessity, also be used.

Using the patented process, the degree of desulfonation realized is a factor of and controlled by the amount of caustic interjected for the reaction; the strength of the oxidation effected (i.e. the relative amount of air or oxygen employed—although the oxidation conditions cannot be so severe as to induce demethylation consequences); the reaction times and temperatures schedules followed, and the solids dilution, generally aqueous, of the lignosulfonate-containing spent sulfite liquor effluent being treated (with greater dilution conditions tending to lead to more extensive desulfonation probably due to the thereby increased availability of the reacting molecules to the oxidizing influence applied).

While very desirable partially desulfonated lignosulfonate materials are prepared with the alkaline oxidation conducted on a spent sulfite liquor containing, on a weight percent basis, from about 30 to 35% of dissolved solids, the spent liquors being cooked in the desulfonation process may have as little as 14–10% to as much as 40% solids content in order to obtain beneficial desulfonated products.

Practically, almost any caustic alkaline solution can be employed for effecting the partial desulfonation reaction, although lower alkalinity generally results in less desulfonation. More caustic is required when sugars and other saccharides are present (and they are usually present with otherwise untreated spent sulfite liquors) in any varied or more substantial amounts in order to effect the decomposition of such saccharides. Ordinarily, very good results are achieved when sufficient caustic concentration is maintained throughout the desulfonating cook to maintain the reaction mass in the relatively high pH range of between about 10.5 and about 11. For example, a quite satisfactory proportion of lignosulfonate solids to caustic to employ in the reaction mass involves use of an aqueous lignosulfonate solution of about 31–32 wt. % and having a specific gravity around 1.22–1.24 or so containing a caustic concentration in the solution of about 140 gms. NaOH liter.

Adequate oxidation conditions to achieve desired ranges of desulfonation of the lignosulfonate in the spent sulfite liquor may be achieved by providing almost invariably from either air or oxygen passed through the cooking reaction mass, between about 20–25 or so and about 40–50 or so grams of elemental oxygen (i.e. $O_2$) per each 100 grams of lignin in the lignosulfonate material being desulfonated. In actual practice to obtain a frequently more desirable range of partially desulfonated material, between about 27 and 35 grams of $O_2$ per gram of lignin are utilized.

While variations may be encountered, temperatures on the range of from about 140° to about 170° C., advantageously in the neighborhood of 165° C., are usually most desirable to utilize. Of course, the reacting mass is cooked until the desired degree of desulfonation (or, when vanillin by product is important, the desired yield of it) is obtained. Usually and at the 165° C. level the cooking time is on the order of 45 minutes or so, the optimum time to employ, as will be appreciated by those skilled in the art, depending on reaction conditions and the particular degree of desulfonation desired in the resulting partially desulfonated lignosulfonate material. It is oftentimes most advantageous (if not literally necessary for material handling purposes) to terminate the cooking while some free caustic still remains in the reaction mass. This tends to prevent problems of emulsification during subsequent recovery of the partially desulfonated lignosulfonate. Beneficially and for the indicated purpose, the reaction may accordingly be finished when, say, about 4–5 gms./liter of free NaOH is found to remain in the reaction mass.

Practice of the process of U.S. Pat. No. 2,491,832 yields, in effect, a spent oxidized liquor which, as has been disclosed and as is known, contains partially desulfonated, generally acid-insoluble, chemically altered organic lignin substances. These are usually isolated and/or fractionated by acid (namely, sulfuric) precipitation which eliminates various sludge-producing, mostly calcium-based, ingredients therein. After the precipation, the purified partially desulfonated lignosulfonate material is generally dissolved in caustic to yield a sodium salt; then spray or otherwise dried to yield a powder product—although, if desired, it may be finally prepared and used in an undried liquified form or reconstituted to an aqueous liquid of any desired concentration.

The partially desulfonated lignosulfonate material thus obtained is not directly procurable from original spent sulfite liquors as are the normally-gotten and ordinarily so-called, albeit undesulfonated, "lignosulfonatess;" it being an exceptionally pure material containing essentially no sugars or polysaccharides; having only vanishing traces, if any, of combined sulfur in sulfite form; and also having other inherent distinguishing features including relatively uniform and substantially constant relative molecular size characteristics.

Although a sugar and saccharide-containing spent sulfite liquor is desirable to employ as the starting material for preparation of partially desulfonated lignosulfonates from which the resulfonated compositions of the present invention are derived, otherwise treated spent sulfite liquors may equivalently be utilized. These, for example, may be those which have previously been treated in divergent ways and for other initial conversion purposes wherein the sugars and/or saccharides are utilized and consumed, as in the preliminary manufacture from raw spent sulfite liquor of yeast or alcohol or in other ways giving a sugar and/or saccharide -reduced or -free spent sulfite liquor.

The alkaline oxidized, partially desulfonated lignosulfonates which are aninonic polyelectrolytes with a relative molecular size usually on the order of 1,000 to 20,000 and from which the resulfonated products are obtained according to the instant invention generally have an organic sulfonic sulfur, i.e., $—SO_3$, content calculated as percent sulfur by weight of broadly between about ½ and about 5 wt. %. More advantageously for many purposes, this sulfur range is between about 1¾ and about 3¾ wt. %; while quite often it is preferable for the partially desulfonated lignosulfonate to contain from about 2.2 to about 2.8 wt. % of the combined sulfur which represents its appearance in the sulfonic form.

A commercially available product, "MARASPERSE CB" TM obtainable from AMERICAN CAN COMPANY, is a good example of an excellent alkaline oxidized, hydrolyzed, partially desulfonated lignosulfonate material useful in practice of the present invention.

"MARASPERSE CB," as usually available, generally has the following typical analysis parameters and physical characteristics features:

| TYPICAL ANALYSES (Moisture-Free and Wt. % Basis): | |
|---|---|
| pH - 3% Solution | 8.5–9.2 |
| Total Sulfur as S, % | 2.5–2.9 |
| Sulfate Sulfur as S, % | 0.1–0.25 |
| Sulfite Sulfur as S, % | 0–0.05 |
| CaO, % | 0.02–0.05 |
| MgO, % | Trace–0.03 |
| $Na_2O$, % | 9.4–9.9 |
| Reducing sugars, % | 0 |
| $OCH_3$, % | 12.4–12.9 |
| Sodium Lignosulfonate, % | 99–99.6 |
| Solids, % | 92–94 |
| ULTRAVIOLET ANALYSES (K-value representing base line) | |
| Upper UV: | |
| K Solids at Max. (275 cms) | 29–30.5 |
| K $OCH_3$ at Max. | 225–250 |

-continued

| | |
|---|---|
| Differential UV: | |
| Max. cms | 250–252 |
| K Solids at Max. | 10–11.3 |
| K $OCH_3$ at Max. | 82–88 |
| Baseline K Solids | 9.5–10.3 |
| Phenolic OH, % | 1.8–2.1 |
| $OH/OCH_3$ | 0.26–0.30 |
| PHYSICAL CHARACTERISTICS | |
| Usual Force | Powder |
| Moisture Content (Max. % $H_2O$) | 8.0 |
| Color | Black |
| Bulk Density (lbs./cu. ft.) | 43–47 |
| Solubility in Water (%) | 100 |
| Solubility in Oils and Most Organic Solvent (%) | 0 |
| Surface Tension, 1% Sol's (in dynes/cm) | ca. 51.4 |

While the known alkaline oxidized, hydrolyzed, partially desulfonated lignosulfonates, including such things as "MARASPERSE CB," are excellent surfactant, dispersant, detergent and otherwise attractively-propertied materials very good for a wide variety of uses, they still have certain intrinsic inadequacies and limitations leaving some disiderata and unfulfilled capacbility for use in many crucial applications and for expanded applicability in and for many highly advantageous purposes. Noteworthy amongst these are difficulties in the employment of the mentioned partial desulfonated lignosulfonates are their relatively limited solubility in saline solutions plus their sometimes not totally satisfactory potential for having extraordinarily superb general surfactant exhibitions.

FIELD AND OBJECTIVES OF THE INVENTION

This invention pertains to and resides in the general field of relatively pure lignosulfonate derivatives having greatly enhanced solubility, especially in saline and acid environments and also having improved dispersant and surfactant properties. Amongst its principal aims and objectives are the provision of such lignosulfonates.

BRIEF DESCRIPTION OF THE DRAWING

The FIGURE is a graph showing the relative molecular size properties of the invention in contrast to conventional products known heretofore.

PARTICULARIZED DESCRIPTION OF THE INVENTION

The compositions of this invention are, basically, resulfonated derivatives of the above-described and identified alkaline oxidized, hydrolyzed, partially desulfonated lignosulfonates. Besides their unique chemical constitution, they are characterized in having (as compared to most other so-called lignosulfonates) an evened-out and/or very similarly dimensioned relative molecular size range with usual tolerances therein within a 10–20% size measure from any given constant (particularly in volumetric comparison with the molecular size of 2-naphthalene sulfonic acid); a solubility—expecially as regards saline solution tolerance or compatibility and/or in aqueous acidic media at least 10 percent and usually 2 to 3 times greater than that of the partially desulfonated lignosulfonate starting material from which the resulfonated products of the present invention are derived; and a substantially increased; i.e., at least 50 percent and up to 15–20 times surfactant and dispersant activity.

The resulfonated compositions are readily obtained by the direct sulfonation of sulfoalkylation of the referenced alkaline oxidized, hydrolyzed, partially desulfonated lignosulfonate starting material. Ordinarily and most conveniently, this is done with appropriate sulfonating reagents in an aqueous solution of the starting material, advantageously using agitation during the reaction (which is better when applied vigorously and may be either by mechanical mixing or stirring and/or from the agitating effects of steam being pressed into the reaction mass when steam is used for heating), at any desired suitable temperature. In general, the reaction can be conducted over a temperature range from about 50° to about 200° C., although it is ordinarily desirable to run at least at the boil (i.e., about 100° C. or so) in order to avoid unduly long reaction times. Ordinarily, a temperature on the order of 160° C. is satisfactory for most of the resulfonations done. Of course, the reaction is accomplished under corresponding pressure when temperatures over boiling are utilized. The time of reaction generally varies with the temperature involved; lower temperatures requiring longer times. At high temperatures the resulfonations can be completed in as little as ½ hour or so while temperatures at the lower end of the scale may require as much as 16 or more hours for completion. When conducted at about 160° C., the resulfonation cooking is usually completed within about an hour.

Any suitable sulfonation reagents may be used for the resulfonation reaction. When straight sulfonations are desired, they may be advantageously accomplished with an alkali metal (such as sodium) sulfite or sulfur dioxide. Sulfoalkylations, as are frequently quite desirable, are done with mixtures of an appropriate lower alkyl aldehyde and a bisulfite. The sulfonate group, per se, that is attached in straight sulfonation is, of course, $—SO_3H$. The sulfoalkylates, which ordinarily involve 1 to 3 carbon atom alkyl units are of the structure $—(CH_2)_x—SO_3H$, wherein x is usually an integer from 1-3 and when x is plural the alkyl unit may be linear in attachment or, as is probably the more frequent case, comprised of side-chain arrangements.

The aldehyde utilized in at least approximative stoichiometric proportions with the bisulfite in the sulfoalkylations performed for the resulfonation is generally of the structure: RCH:O, wherein R is hydrogen or an alkyl group containing from 1 to 3 carbons. Obviously, if desired, mixed aldehyde reaction systems may be utilized even though there is ordinarily no particularly advantage in this. Usually, it is very desirable to accomplish the resulfonation with a sulfomethylating reaction using formaldehyde ($CH_2O$) and sodium bisulfite ($NaHSO_3$) as reagents so as to make sulfomethyl ($—CH_2SO_3H$) attachments in the resulfonated product.

As indicated, about stoichiometric relative proportions of the aldehyde and bisulfite reagents are employed for the resulfonation; these being used in amounts calculated to effect the desired extent or quantity or sulfonic acid units in the finally obtained resulfonated product. Actually, a plus or minus 20% tolerance from exactly stoichiometric ratios is tolerable. In sulfomethylating reactions, the amount of formaldehyde used may vary from about 1½ to about 12 wt. % of the desulfonated starting material being resulfonated while the bisulfite can correspondingly be utilized in quantities, on the same basis, of between about 5 and about 40 wt. %. A particularly desirable resulfomethylated product containing about 5½ wt. % of sulfur in organic sulfonic sulfonate form is obtained by the reaction in the described manner of "MARASPERSE CB" with about 15 wt. % of sodium bisulfite and 4½ weight % of formaldehyde, based on "MARASPERSE CB" weight, cooked for 1 hour at 160° C.

The resulfonated products of the present invention may, as desired, contain anywhere from about 1½ wt. % to 14–15 wt. % of total sulfur in combined organic sulfonic sulfonate form. Advantageously the range of such sulfur is between about 2¾ and about 10 wt. %, with greater desirability oftentimes attained in the sulfur wt. % range of from about 4½ to about 6½ wt. %.

While it is not intended to be bound by any particular theory, it is believed that the starting alkaline oxidized, hydrolyzed, partially desulfonated lignosulfonate material (as obtained when following the procedures of U.S. Pat. No. 2,491,832) has the sulfonic acid group attachments at least sustantially if not predominantly or entiresly on the side chains of and in the lignin molecules, this ordinarily being on the side chain carbons which are in the alpha position relative to the ring and carrying over from the initial substitutions made during the original sulfite pulping operations. On the other hand and surprising as it is, it is believed the sulfonate and/or sulfoalkyl units prepared in practice of the present invention are substantially if not predominantly or entirely positioned in ortho and/or para substitutions on the aromatic rings of the lignin molecules. Thus, the resulfonated product of the instant invention is, quite obviously, a basically different and dissimilar lignosulfonate from the lignosulfonate material found in spent sulfite liquors from which are obtained the starting lignosulfonates that are resulfonated in present practice.

A typical resulfonation reaction pursuant to the present invention may be figuratively represented by the following, presumed-to-be accurate chemical reaction formulae:

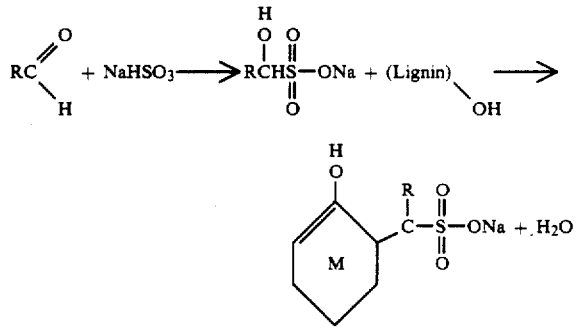

EXEMPLIFICATION OF THE INVENTION

The following detailed Illustrations more particularly delineate and show the extroardinary benefits and advantages obtained in and by practice of the present invention and with the exceptionally useful and versatile resulfonated lignosulfonate composition products obtained thereby.

First Illustration

Excellent quality resulfonated derivatives, containing about 5.5 or so wt. % of organic sulfonic sulfur (based on composition weight) are made in large scale preparations by the sulfomethylation of "MARASPERSE CB" containing about 2.6 or so wt. % of total sulfur measured as S according to the following general procedure (in which all percentages are on a weight basis):

A Synopsis of Procedure

The "MARASPERSE CB" liquor is sulfomethylated by cooking 1 hour at 160° C. with 15% $NaHSO_3$ and 4.5% $CH_2O$.

| Molecular Weights of Particular Reagents Involved: | | |
|---|---|---|
| Formaldehyde | $CH_2O$ | 30 |
| Sodium Bisulfite | $NaHSO_2$ | 104 |

B. Bill of Materials

| | Basis: Per 100 lbs. Finished Product In lbs. Solids | Basis: Approximate 6000-gallon Batch Gallons (U.S. Measure) | Pounds Liquid | Solids, lbs./gal. | Pounds Solids |
|---|---|---|---|---|---|
| "MARASPERSE CB" | | | | | |
| Liquor | 85.50 | 5,400 | 52,800 | 3.71 | 20,000 |
| Formaldehyde | 3.85 | 270 | 2,450 | 3.33 | 900 |
| Sodium Bisulfite | 12.80 | | 3,000 | | 3,000 |
| Total | 102.5 | | 58,250 | | 23,900 |
| Finished Product | 100 | | | | 23,400 |

C. Procedure in

I. Makeup

1. Pump "MARASPERSE CB"]liquor to process tank (about 5500 gallons);

2. Measure the volume in the tank;

3. Take a pint sample;

4. Check temperature and specific gravity of the liquor;

5. Determine the pounds per gallon of liquor solids from the gravity reading;

6. Agitate and steam the liquor to about 80° C; then

7. Add 4.5% formalehyde based on the "MARASPERSE CB" liquor solids (A 490-lb. drum of formaldehyde at 37% solids containing 10 lbs.

8. Slowly and with good agitation, add 15% sodium bisulfite based on "MARASPERSE CB" liquor solids (taking into account that if this is added too fast, it will not mix in); then 9. After the bisulfite is completely mixed in, continue agitation for 15 minutes.

II. Reaction

1. Transfer about 1850 gallons of liquor to a feed tank for the high temperature, pressure reaction vessel while maintaining the temperature at about 80° C.

2. Dump the liquor from the feed tank to a stirred, autoclave-type, pressure, reactor;

3. Steam to 160° C.;

4. Cook 1 hour at 160° C.;

5. Blow the cook slowly to avoid foaming;

D. Process Variables

The "MARASPERSE CB" liquor should have a gravity of 1.16 to 1.18 at room temperature, (3.5 to 3.9 lbs. solids/gallon) with maximum soluble lime less than about 0.1% CaO. The addition of the bisulfite to the liquor is critical. This must be done very slowly to avoid forming a crust on the surface, which is very difficult to break up.

Following the preparation, the products are readily obtained in solid (usually powdered) alkali metal (i.e., generally sodium) salt form by spray or other drying procedures.

The resulfonated lignosulfonate products obtained from the above-specified preparation procedure having outstanding qualities and characteristics in all of the particulars specified in the foregoing "PARTICULARIZED DESCRIPTION OF THE INVENTION". They are: soluble in synthetic and natural (such as North Sea water) salt solutions; dissolvable with ease in acid media as low as pH 1.5 or so; markedly surfactant; have a close molecular size range constancy of easily less than a 20% measure (and usually closer to 10% and frequently much less in this) when collated to a given standard size of molecule such as 2-naphthalene sulfonic acid (i.e., "2-NSA") as indicatable by diffusion tests through micro-size porous filter media consisted of cellulose type cell membranes, or filters, having average pore sizes of 0.4 microns.

The graph presented in the accompanying Drawing nicely demonstrates as a typical representation the very close relative molecular size constancy of the resulfonated lignosulfonates of the present invention as compared to conventional and heretofore-known "lignosulfonate" products. As is apparent therein, the resulfonated desulfonated lignosulfonated compositions of the present invention have (in contradistinction with normal and ordinarily obtained "lignosulfonates") the described relatively narrow relative molecular size average particulars.

The resulfonated products obtained by the foregoing Procedure are all found to be extremely useful and effective as improved dispersing agents for dyestuffs, pesticide materials, clays and so forth and in and for ceramic refractory preparations; as well as for the emulsification of oils and various petroleum products and, additionally, a valuable and highly efficacious retarding agent for oil well cement compositions to precisely control and regulate the setting under high temperature and pressure conditions even in highly saline aqueous environments. The latter application is more particularly described in the concurrently-filed, co-pending Application of the Applicants entitled "WELL CEMENTING", having Ser. No. 671,159 filed Mar. 29, 1976.

Similar very good results, using appropriate reagents for the purpose, are realized when the resulfonated products are made by direct non-alkyl-group-containing sulfonations as well as for sulfoethylations, sulfopropylations and so forth.

Second Illustration

Using resulfomethylated products prepared according to the First Illustration, a number of salt tolerance tests in extremely high concentration synthetic aqueous saline solution are performed. In each, the salt solution is made up in water to a total volume of 1 liter and is composed, in the water, of 50 gms. of sodium chloride (NaCl), 16.5 gms. of calcium chloride ($CaCl_2$) and 15.5 gms. of magnesium chloride ($MgCl_2$). About 0.50 gms. of the lignofulfonate product being tested is put into 2 fluid ounces (about 60 ml) of the solution. Another 50 ml. of the salt solution is then added to the mixture and the entire make-up manually shaken briefly to effect whatever preliminary dissolution can be achieved; after which it is put on a mechanical shaker for one hour to ensure as much as solubilization as possible. Subsequent to that, a 10 ml. portion of the overall mixture is placed into a graduated container tube from a standard laboratory-type DeLaval Centrifuge and centrifuged for 5 minutes thereon at 20,000 RPM The volume percent of sludge found after the centrifugation (based on original volume of centrifuged material) is then measured. In all cases, the resulfonated products of the First Illustration have never more than 2.0 and usually (at least about 9 out of 10 times) less than 1.6 volume percent of removed sludge after the centrifugation. In contrast and by application of the same saline solubility test, the general type of "MARASPERSE CB" starting material utilized in the First Illustration has about a 6 volume percent sludge level after the centrifugation analyses.

Analogous results are obtained when the same saline solubility tests are repeated excepting to utilize, as the aqueous saline media; (i) 200 grams/liter. NaCl solution; and/or "North Sea" water comprised, per liter, of 30.0 gms. NaCl, 1.16 gms. $CaCl_2$ and 5.54 gms. $MgCl_2$(giving a total dissolved content of 36.70 gms./liter of such salts).

Third Illustration

A desulfonated lignosulfonate from the vanillin process containing 0.7 wt. % combined sulfur as organic sulfonic sulfonate was attempted, in a 5 gm. quantity, to be dissolved in 50 ml. of pH 1.5 sulfuric acid then filtered through a fine mesh filter. The attempted solution was very turbid in appearance and, after passage through the filter (during which it filtered very slowly), left 4.7 gms. of undissolved solids out on the filter paper.

In contrast, three resulfonated or resulfomethylated products made from the same desulfonated starting material were subjected to the same test. Sample "X" of the resulfonated or resulfomethylated product contained 1.5 wt. % combined sulfur, Sample "Y" 2.3% and Sample "Z" 2.0%. The Sample "X" solution was slightly turbid and filtered slowly but left only 0.2 gms. of undissolved solids on the filter paper. Sample "Y" was a clear brown liquid in the strong acid solution but filtered quite rapidly and left no residue (i.e., actually 0.0 gms.) on the filter paper which remained clean after filtration. Sample "Z" while producing a slightly turbid solution, also filtered rapidly and left no measurable residue on the filter paper which appeared only very slightly discolored after the filtration.

Fourth Illustration

A sample of "MARASPERSE CB" (2.6 wt. % S) and, for comparative purpose, a sampleof a resulfomethylated derivative thereof made to a 5½ wt. % S content according to the procedure of the First Illustration were tested as dispersants for Stellar clay according to the well-known, standard ASP-200 Stellar Clay Test using for the measurement a Fann Rotational Viscosimeter obtained from the Fann Instrument Company of Houston, Tex. Values for yield point, zero gel and Fann 600°, 300°, 200°, 6° and 3° settings were obtained. The data obtained, of course, represents the force required to move a stationary clay system through the plug flow to plastic flow condition in a pipe with the numerical measurements taken in lbs./.100 ft.$^2$ of pipe surface; lower readings indicating better dispersant effect by the additive as the consequence of requiring less force for the movement of the mixture through the apparatus. The results were as follows:

| Product | Yield Point | Fann* 600 | 300 | 200 | 100 | 6 | 3 | Zero gel |
|---|---|---|---|---|---|---|---|---|
| "MARASPERSE CB" | 69 | 91 | 80 | 72 | 63 | 39 | 34 | 36* |
| RESULFOMETHYLATED DERIVATIVE | 16 | 34 | 25 | 22 | 18 | 13 | 13 | 15 |

The superiority of the product made in accordance with the present invention is easily discernible and plainly evident from the foregoing.

Fifth Illustration

A series which included a compositino of a normal (and not resulfonated) desulfonated lignosulfonate (as obtained from spent oxidized liquor from the vanallin process pursuant to the above-identified U.S. Pat. No. 2,491,832) and resulfonated (more precisely, resulfomethylated) derivatives thereof prepared according to the First Illustration hereof were tested for their propensities and capabilities to disperse and control the setting retardation times of Type I cements (i.e., similar to that prescribed in ASTM C150 specifications for cements) using The Fann Viscosimeter Apparatus (as described in the above Fourth Illustration) to finally measure the results. Each of the test sample compositions was made up with 300 gms. of the Type I cement (obtained from IDEAL CEMENT COMPANY), 25 gms. of NaCl (giving, in effect, in the final composition about a 15 wt. %, based on total composition weight, aqueous salt solution), 3 gms. of the lignosulfonate additive and 138 ml. of distilled water. In each case the composition to be tested was preliminarily prepared by adding, in a laboratory-style Waring Blender operated at low speed: the lignosulfonate dispersant to the water; then the salt; followed by the cement. Shearing of each constitution was done for 10 minutes at a 40 volt setting (60 cycle AC) of the Blender. After the mixing, each sample mix was placed in the appropriate testing cup to each of which was added one drop (i.e., about 0.1 cc.) of octanol before placing each for testing in the Fann Viscosimeter. The results were as set forth in the following tabulation, wherein the Sample "D" was the starting desulfonated lignusulfonate (obtained, as above-described, from vanillin process) containing 0.66 wt. % of organically combined sulfonic sulfonate sulfur while Samples "A", "B" and "C" were resulfomethylated derivatives thereof containing, respectively, 2.10–2.29 –3.65 wt. %'s of sulfonic sulfur with additional minor quantities of non-sulfonic sulfur contained therein (all as determined by the method described at pg. 850 "Analytical Chemistry" in Vol. 32, No. 7, for June 1960).

| Sample No. | Yield Point | Fann* 600 | 300 | 200 | 100 | 6 | 3 | Zero Setting Time gel To Light Gel | |
|---|---|---|---|---|---|---|---|---|---|
| "A" | 102 | 164 | 133 | 120 | 104 | 59 | 48 | 53 | 3 hrs. |
| "B" | 101 | 159 | 130 | 116 | 101 | 56 | 43 | 53 | 3 hrs. |
| "C" | 70 | 114 | 92 | 87 | 70 | 49 | 32 | 37 | 4 hrs. |
| "D" | 112 | 176 | 144 | 128 | 111 | 50 | 50 | 62 | 2 hrs. |

These data dramatically illustrate the improvement in cement retardation achieved with the compositions of the present invention.

Many changes and modifications can readily be made and adapted in embodiments in accordance with the present inveniton without substantially departing from its apparent and intended spirit and scope, all in pursuance and accordance with same as it is set forth and defined in the hereto appended claims.

What is claimed is:

[1. A composition comprising:

a lignosulfonate or an alkali metal salt derivative thereof derived from sulfite waste liquor that has been subjected to alkaline oxidation, hydrolysis and partial desulfonation with subsequent resulfonation;

said lignosulfonate prior to resulfonation being characterized by a relative molecular size of substantially within the range of 1,000 to 20,000 and containing combined organic sulfonic sulfur after partial desulfonation of from about 0.5 weight percent to about 5.0 weight percent and from about 1.5 percent to 15 percent by weight of said total combined sulfur upon completion of said resulfonation.]

[2. A composition comprising:

an alkaline oxidized hydrolyzed, partially desulfonated and subsequently resulfonated lignosulfonate;

said resulfonated lignosulfonate having substituted therein, as the resulfonation units, those of the formula:

$-(CH_2)_x-SO_3H$, wherein x has a numerical integral value from 0 to 3; or alkali metal salt derivatives thereof; and said resulfonated lignosulfonate containing between about 1½ weight percent and about 15 weight percent of total sulfur in combined organic sulfonic sulfonate form; said lignosulfonate prior to resulfonation having a relative molecular size of substantially 1000 to 20,000.]

[3. The composition of claim 2, wherein there is between about 2½ and about 10 wt. % of said total combined sulfur.]

[4. The composition of claim 2, wherein there is between about 4½ and about 6½ % of said total combined sulfur.]

[5. The composition of claim 2, wheren said resulfonation unit is a sulfomethyl group of the formula $-(CH_2)SO_3H$.]

[6. The composition of claim 2 in the form of an alkali metal salt.]

[7. The composition of claim 2 in the form of a sodium salt.]

[8. The composition of claim 2 and further characterized in having a relatively constant relative molecular size range with molecular size variations in the composition being within not more than about a 20% volumetric molecule size to molecule size variation one from another.]

[9. A composition in accordance with the composition of claim 8 wherein said relative molecular size range variation from molecule to molecule in the composition is not more than about 10 volumetric %.]

[10. The composition of claim 2, and further characterized in having the inroduced sulfonate units substituted at least substantially in the resulfonated alkaline oxidized, hydrolyzed, partially desulfonated lignosulfonate material in ortho or para locations, or both, on the aromatic rings of the lignin molecules in the resulfonated, partially desulfonated lignosulfonate material of said composition.]

[11. A composition in accordance with the composition of claim 10, wherein said substituted introduced sulfonate units are located predominently in the ortho or para, or both, locations of said aromatic lignin molecule rings.]

[12. A composition as claimed in claim 1 wherein said combined organic sulfonic sulfur is present upon completion of resulfonation in an amount by weight of from 2.75 percent to about 10 percent by weight.]

[13. A composition as claimed in claim 12 wherein said combined organic sulfonic sulfur is present upon completion of resulfonation in an amount by weight of from about 4.5 percent to about 6.5 percent by weight.]

[14. A composition as claimed in claim 1 wherein said resulfonation is undertaken in an aqueous medium and in the presence of a reactant composition comprising about 5 percent to 40 percent, by weight of said desulfonated lignosulfonate, of alkali metal sulfite.]

[15. A composition as claimed in claim 14 wherein said sulfite is an alkali metal bisulfite.]

[16. A composition as claim in claim 15 wherein said sulfite is sodium bisulfite.]

[17. A composition as claimed in claim 14 wherein said reactant composition includes one or more aldehydes of the formula:

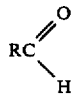

wherein R is hydrogen or an alkyl group containing from 1 to 3 carbon atoms.]

[18. A composition as claimed in claim 17 wherein said aldehyde is formaldehyde.]

[19. A composition as claimed in claim 18 wherein said formaldehyde is present in an amount by weight of said partially desulfonated lignosulfonate of about 1.5 percent to 12 percent.]

[20. A composition as claimed in claim 18 wherein said formaldehyde is present with an alkali metal bisulfite in approximately stoichiometric proportions.]

[21. A composition as claimed in claim 20 wherein said stiochiometric proportions of formaldehyde to bisulfite may vary by up to 20 percent.]

[22. A composition as claimed in claim 1 wherein said lignosulfonate after resulfonation is characterized in being substantially completely soluble in each of aqueous saline solutions and acid media having a pH of at least about 1.5.]

[23. A composition as claimed in claim 1 wherein said lignosulfonate prior to resulfonation is characterized by a pH in aqueous solution of 8.5 percent to 9.2 percent; a total sulfur content 2.5 percent to 2.9 percent by weight; the absence of reducing sugars; and a lignosulfonate content of at least 99 percent by weight.]

[24. A composition as claimed in claim 1 wherein said lignosulfonate is further characterized by a methoxyl content of from 12.4 to 12.9 weight percent.]

[25. A composition as claimed in claim 23 wherein said resulfonated lignosulfonate has a relative molecular size of 4200.]

[26. A composition as claimed in claim 23 wherein said resulfonated lignosulfonate has a relative molecular size of about 3500.]

[27. A composition as claimed in claim 22 wherein said aqueous saline solution contains relatively large concentrations of sodium chloride and said acid media comprises an aqueous sulfuric acid solution at a pH within the range of about 1.5 and less than 7.]

[28. A composition as claimed in claim 1 wherein said resulfonation is accomplished in an aqueous reaction mass at a temperature between about 50° and about 200° C. using, for the resulfonation agents, an aldehyde of the formula:

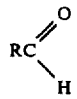

wherein R is hydrogen or an alkyl group containing from 1 to 3 carbon atoms in approximately stoichiometric admixture with a sulfur of the formula:

$XHSO_3$ wherein X is an alkali metal.]

*29. A high efficiency, non-gelling retarder composition having a high degree of predictability for use in oil well cementing compositions under highly saline environment, said retarder composition comprising:*

*a lignofulfonate or an alkali metal salt derivative thereof derived from a sulfite waste liquor that has been subjected to alkaline oxidation, hydrolysis and partial desulfonation with subsequent resulfonation;*

*said lignosulfonate prior to resulfonation being characterized by a relative molecular size of substantially within the range of about 1,000 to about 20,000 and containing combined organic sulfonic sulfur after partial desulfonation of from about 0.5 weight percent to about 5.0 weight percent and from about 4.5 weight percent to about 15 percent by weight of said total combined sulfur upon completion of said resulfonation, and wherein said lignosulfonate after resulfonation is substantially completely soluble in aqueous saline solution containing relatively large concentrations of sodium chloride and in acid media at pH as low as about 1.5.*

*30. A high efficiency, non-gelling retarder composition having a high degree of predictability for use in oil well cementing compositions under highly saline environment, said retarder composition comprising:*

*an alkaline oxidized hydrolyzed, partially desulfonated and subsequently resulfonated lignosulfonate;*

*said resulfonated lignosulfonate having substituted therein, as the resulfonation units, those of the formula:*

*$—(CH_2)_x—SO_3H$, wherein x has a numerical integral value from 0 to 3; or alkali metal salt derivatives thereof; and*

*said resulfonated lignosulfonate containing between about 4.5 weight percent and about 15 weight percent of total sulfur in combined organic sulfonic sulfonate form; said lignosulfonate prior to resulfonation having a relative molecular size of substantially 1,000 to 20,000, and wherein said lignosulfonate after resulfonation is completely soluble in aqueous saline solution containing relatively large concentrations of sodium chloride and in acid media at pH as low as about 1.5.*

*31. The combination of claim 30, wherein there is between about 4.5 and about 6.5 weight percent of said total combined sulfur.*

*32. The composition of claim 30, wherein said resulfomethylation unit is sulfomethyl group of the formula $—(CH_2)SO_3H$.*

*33. The composition of claim 30 in the form of an alkali metal salt.*

*34. The composition of claim 30 in the form of sodium salt.*

*35. The composition of claim 30 further characterized in having a relatively constant molecular size range with molecular size variations in the composition being within no more than about 20 volumetric percent.*

*36. A composition as in claim 34, wherein said relative molecular size range variation from molecule to molecule in the composition is no more than about 10 volumetric percent.*

*37. The composition of claim 30 further characterized in having the introduced sulfonate units substituted at least substantially in the resulfonated alkaline oxidized, hydrolyzed, partially desulfonated lignosulfonate material in ortho or para locations, or both, on the aromatic rings of the lignin molecule in the resulfonated, partially desulfonated lignosulfonate material of said composition.*

*38. A composition as in claim 37, wherein said substituted introduced sulfonate units are located predominantly in the ortho or para locations, or both, of said aromatic ring of the lignin molecule.*

*39. A composition as in claim 29, wherein said combined organic sulfonic sulfur is present, upon completion of sulfonation, in an amount of from about 4.5 to about 6.5 percent by weight.*

*40. A composition as in claim 29, wherein said resulfonation is carried out in an aqueous medium and in the presence of a reactant composition comprising from about 5 to about 40 percent, by weight of said desulfonated lignosulfonates, of alkali metal sulfite.*

*41. A composition as in claim 40, wherein said sulfite is an alkali metal bisulfite.*

*42. A composition as in claim 41, wherein said sulfite is sodium bisulfite.*

*43. A composition as in claim 40, wherein said reactant composition includes one or more aldehyde of the formula:*

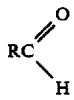

*wherein R is hydrogen or an alkyl group containing from 1 to 3 carbon atoms.*

*44. A composition as in claim 43, wherein said aldehyde is formaldehyde.*

*45. A composition as in claim 44, wherein said formaldehyde is present in an amount by weight of said partially desulfonated lignosulfonate of about 1.5 to about 12 percent.*

*46. A composition as in claim 44, wherein said formaldehyde is present with an alkali metal bisulfite in approximately stoichiometric proportions.*

*47. A composition as in claim 46, wherein said stoichiometric proportions of formaldehyde to bisulfite may vary by up to about 20 percent.*

*48. A composition as in claim 29, wherein said lignosulfonate is further characterized by a methoxy content of from about 12.4 to aout 12.9 weight percent.*

*49. A composition as in claim 29, wherein said resulfonation is accomplished in an aqueous reaction mass at a temperature between about 50° C. and about 200° C. using, for the resulfonation agent, an aldehyde of the formula:*

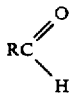

*wherein R is hydrogen or an alkyl group containing from 1 to 3 carbon atoms in approximately stoichiometric admixture with a sulfite of the formula XHSO3, wherein X is an alkali metal.*

* * * * *